United States Patent

[11] 3,589,356

| [72] | Inventor | Daniel Silverman |
| | | 5969 South Birmingham, Tulsa, Okla. 74105 |
| [21] | Appl. No. | 855,430 |
| [22] | Filed | Sept. 4, 1969 |
| [45] | Patented | June 29, 1971 |
| | | Continuation of application Ser. No. 499,292, Oct. 21, 1965, now abandoned. |

[54] METHOD FOR EVERTING AND EXTRAVERTING FLEXIBLE TUBING INTO A BODY CAVITY
20 Claims, 7 Drawing Figs.

[52] U.S. Cl.................................................. 128/1.2, 128/262
[51] Int. Cl.................................................. A61b 6/00, A61m 31/00
[50] Field of Search........................................... 128/1.2, 262, 356, 260, 344, 348—351, 303; 156/287, 294

[56] References Cited
UNITED STATES PATENTS

| 805,851 | 11/1905 | Goldfarb..................... | 128/262 |
| 2,513,527 | 7/1950 | Sjodin........................ | 264/165 |
| 2,794,758 | 6/1957 | Harper et al................. | 156/287 X |
| 3,132,062 | 5/1964 | Lang et al.................... | 156/287 |
| 3,168,092 | 2/1965 | Silverman.................... | 128/1.2 |
| 3,178,732 | 4/1965 | Stibitz....................... | 5/81 |
| 3,224,432 | 12/1965 | Billingsley.................. | 128/1.2 |
| 3,230,129 | 1/1966 | Kelly......................... | 156/287 |

FOREIGN PATENTS

| 215,350 | 10/1909 | Germany...................... | 128/3 |
| 415,482 | 11/1925 | Germany...................... | 128/262 |
| 454,642 | 7/1928 | Germany...................... | 128/262 |

OTHER REFERENCES

Cobbin et al. " Preliminary Report of a New Intestinal Inturbation Principle" SURGERY. April 1964. Vol. 55. #4. pp. 564— 66, 128— 348

Helmholz, JOUR. OF UROLOGY. Vol. 64, #1, July 1950. pp. 158— 166, 128— 262

Primary Examiner—Dalton L. Truluck
Attorney—Everett A. Johnson

ABSTRACT: A system and method for lining an internal body cavity with thin-walled flexible tubing is described. One end of the tubing is closed and the other is sealed to a fluid pressure casing. The closed end of the tubing is initially disposed within the casing and a tension member passing through the casing is fixed to the reentrant tubing end. Instrumentation, radiation sources, etc. are transported by the tension member as the closed end everts through the tubing within the cavity.

The everted tubing is retained within the cavity for a finite time and the initially closed end of the everted tubing may be opened. It is also disclosed that the tubing may be of assimilable material and/or have a coating which affects, or is affected by, the cavity walls or fluids. The tubing is also described as a vehicle for retrieving cavity samples. Embodiments of suitable apparatus are described.

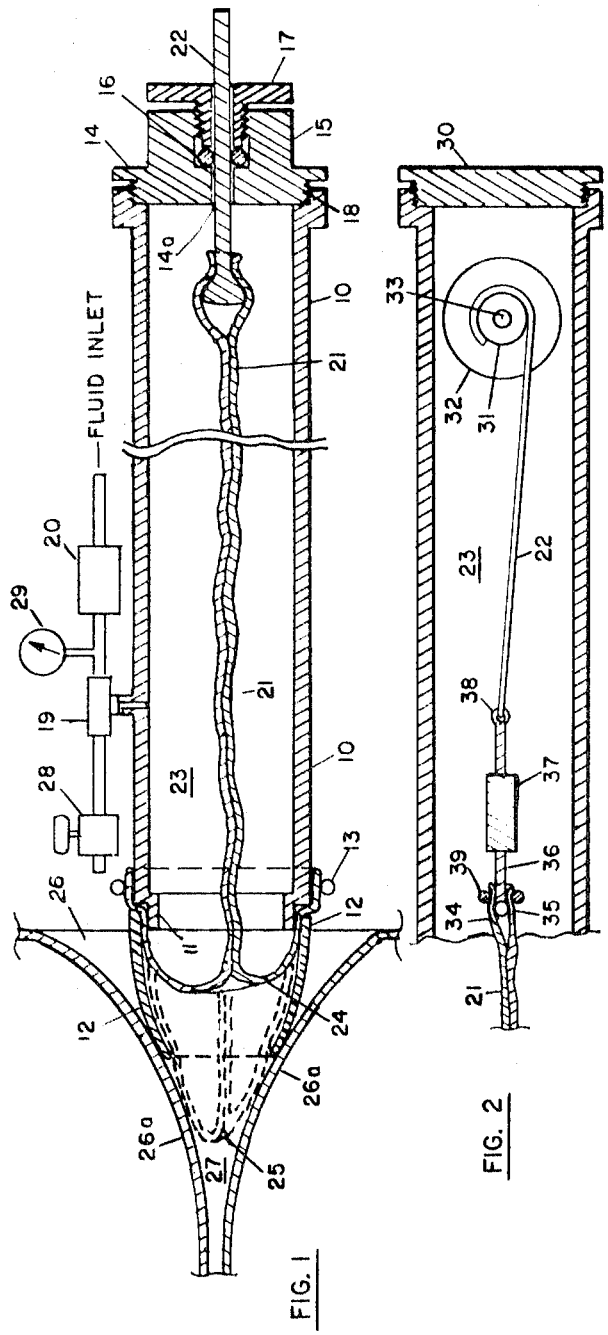
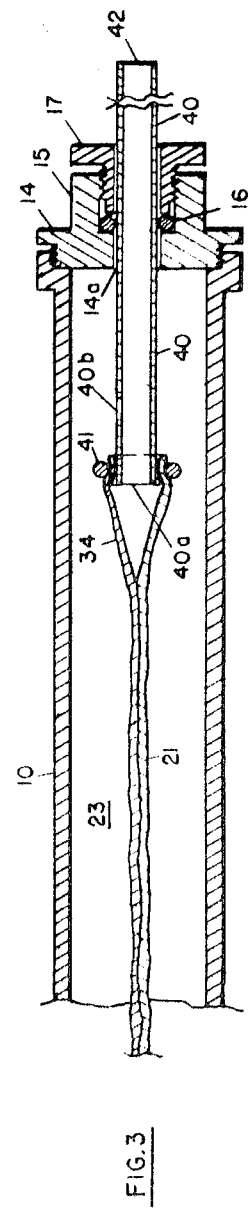

PATENTED JUN 29 1971 3,589,356

INVENTOR.

Daniel Silverman

METHOD FOR EVERTING AND EXTRAVERTING FLEXIBLE TUBING INTO A BODY CAVITY

This application is a streamlined continuation of application Ser. No. 499,292, filed Oct. 21, 1965, and now abandoned.

This invention relates to the art of medical instruments in general and to those instruments which are concerned with the inspection of, sampling of contents from, and the treatment of the walls of internal body cavities, particularly those of great linear extent, and those which are nonlinear and have many bends and turns. However, it can be used in the exploration of cavities, pipes and openings of all types, sizes, shapes, and dimensions.

There are a number of medical instruments available for the probing and inspection of internal body cavities, such as the nose and throat passages, and many tubular conduits, the sampling of contents from such cavities and the placement of medical treating devices therein. These instruments are generally of the rigid mechanical type that require either spreading of the walls of the cavity or the lubrication into such cavities of tubular metallic devices through which, after they are in place, additional instruments can be inserted.

The insertion of these instruments causes pressure and friction along the walls of the cavity, causing pain and discomfort, as well as injury to the tissues. It is thus an object of my invention to provide a method and apparatus for the introduction of medical apparatus into a body cavity without sliding frictional contact with the walls of the cavity and without injury to the tissues. It is a further objective to provide a thin-walled plastic tubular liner, or a thick-walled flexible tubing, introduced into said cavity, through which additional instruments can be introduced into the body cavity and through which samples of the contents of the cavity can be withdrawn. It is a further objective to provide means to contact the walls of an internal body cavity by means of a thin flexible tubular means backed by fluid pressure, to exert a pressure, to chemically or by irradiation treat the walls of said cavity, or to sample, by attachment to said means, the materials on the walls of said cavity.

In principle, my invention comprises a closed housing or container having at one end a tubular projection of a diameter smaller than the cavity diameter, and generally of the approximate diameter of the thin-walled flexible tube to be placed inside of the cavity. A length of thin-walled flexible tubing with one end closed is placed inside the container (closed end first) through the tubular projection. The open end of the tubing is placed over the tubular projection of the container and clamped in pressuretight relation thereto. Means for introducing a gas or liquid under pressure inside the container is provided. This fluid pressure forces the tubing to be ejected out of the container through the tubular opening—being turned inside out as it goes. The internal fluid pressure enables the tubing to exert a pressure on the walls of the cavity to separate them and permit the tubing to be extruded and "grow" in length.

The tubing can be retrieved by being physically withdrawn from the cavity, but preferably, it can be withdrawn by providing a cord or other tension member attached to the closed end inside the container, and to withdraw or wind up the cord by appropriate means, retrieving the tubing, all the while maintaining fluid pressure inside the tubing, by a procedure which is the direct reverse of the insertion process.

As will be explained below, as the tubing is being extruded from the container, the closed end of the tubing can be used to "pull into" the cavity inside of the tubing, sliding along the inside surface of the tubing, instruments of different types, or to pull in a flexible, small bore rigid-walled tubing through which fluids can be sampled from the cavity, or probes can be introduced. By coating the outside of the thin-walled tubing (the inside of tubing before insertion) with chemical treating materials, direct or indirect contact of the walls of the cavity can be effected. By coating the outside of the tubing with adhesive or other materials, samples of the fluids or materials on the walls of the cavity can be obtained.

These and other new and novel uses, benefits, and objectives of my invention will be more clearly described and understood in connection with the attached drawings, in which:

FIG. 1 is a cross-sectional view of one embodiment of my invention showing its general construction and mode of operation.

FIG. 2 is a partial cross section showing an embodiment adapted to facilitate the introduction of medical treating devices.

FIG. 3 is a partial cross section showing another embodiment adapted to facilitate the introduction of a tube through which fluids can be sampled from the cavity and through which probe devices can be introduced into the cavity.

Figure 4:
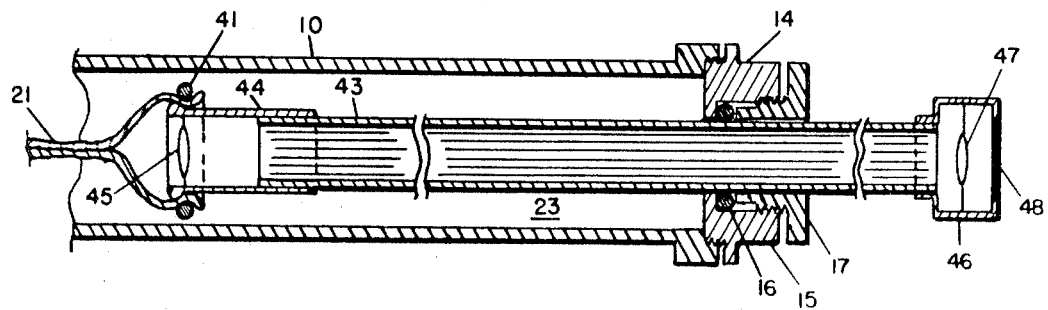
FIG. 4 is a partial cross section showing another embodiment including an optical viewing instrument for exploring the cavity.

In FIG. 1, I show one embodiment of this invention, which has an elongated cylindrical body, chamber or casing 10, preferably made of metal or plastic or the like. However, it need not be a perfectly rigid structure, but may have a certain amount of flexibility. This body has at one end a cylindrical lip 11 over which fits a nosepiece 12 of smooth tapered cylindrical shape. At the other end, the body carries a cap or endpiece 14 which is attached in fluidtight engagement by means such as the threads 18. This cap 14 contains a central opening 14a and a packing gland 15 including deformable packing ring 16 and pressure nut 17. By adjustment of the nut 17, fluidtight seal can be made to a smooth cylindrical surface such as that of cord 22, or rod or tube 40 of FIG. 3, as desired. Different end caps 14 can be provided with different size openings and packing glands to accommodate different size linear cylindrical elements passing therethrough.

Inside the body 10 is a long thin-walled plastic tubing 21 which is attached at one end to the cord 22. At its other end it is expanded and slipped over the lip 11 where it is securely clamped in fluidtight seal by means of the nosepiece 12 and the ring 13. Attached to the wall of the body is a side tube 19 opening into the interior of the body. The tube 19 communicates to a pump 20 by means of which fluids such as air or other gas, or water or other liquid can be introduced into the interior space 23 of the instrument. Fluid pressure inside the space 23 inside of the body causes the tubing 21 to be forced out the end of the instrument, for example, from position 24 to position 25, etc.

If the nosepiece 12 is introduced into a tubular body cavity, 26, having walls 26a (shown in cross section) for example, the outwardly moving tube 21 will extrude itself into the space available such as 27, and will then gently lift and spread the walls. By this process the tubing eventually is completely extruded and lines the walls 26a. However, in this process there is essentially no relative movement of the tubing with respect to the walls of the cavity in a longitudinal direction, and thus no irritation.

The diameter of the tubing 21 when extruded into the cavity and inflated with internal fluid pressure need not be great enough to fully extend the walls of the cavity. For example, if the body cavity were a man's throat, it would be dangerous to completely seal off the passage. In other cases, it might be desired to fully extend the walls of the cavity, either to close off the passage, or, for example, to contact the entire internal area of the cavity for treating purposes.

In FIG. 1, I show that the end of the tubing 21 is tied to a cord 22 which passes out through the packing gland 14 to the outside of the body. When it is desired to withdraw the tubing 21 from the cavity, the cord 22 is pulled back while maintaining internal pressure in the space 23. By this means the entire tubing can be withdrawn without sliding contact against the cavity wall. As the cord 22 is withdrawn, retrieving the plastic tubing 21, fluid must be bled from space 23 to maintain proper pressure. Needle valve 28 is for this purpose.

Of course it is possible to deflate the tubing 21 completely, and collapse it to its smallest cross section and then to withdraw it from the cavity. This procedure may be followed where the cavity is large and there is no danger of injury to the tissues. In the withdrawal process it may be desirable to attach a pressure gauge 29 or other indicator to the space 23 as is well known in the art.

In FIG. 2, I show the body 10 with a closed off end 30 instead of the packing gland cap 14. Inside of the space 23 is a small cylindrical reel or drum 32 with hub 31 and shaft 33. The shaft 33 is journaled in the walls of the body 10, and a knob or handle not shown is provided on the outside of the chamber by means of which the shaft 33 can be turned and the cord 22 wound up on the hub 31.

I have explained in connection with FIG. 1 how it is possible to intrude into an elongated cavity a flexible thin-walled tubing, without sliding contact against the walls of the cavity. As it moves into the cavity it can accomplish one or more of at least six separate services.

A. It can carry or pull into the cavity an instrument or other device. This will be further explained in connection with FIG. 2.

B. It can carry into the cavity a small bore rigid-walled flexible tubing to which a vacuum can be applied to withdraw fluid samples from the cavity. This will be illustrated and explained in connection with FIG. 3.

C. It can carry into the cavity space an instrument for visually observing the interior walls of the cavity. This is illustrated in FIG. 4. In each of these three cases, the tubing 21 need not be of large bore, only large enough to carry inside of it the instruments or devices which are to be introduced into the cavity.

D. The intruding tubing can be of large diameter (slightly larger than the diameter of the cavity) so that it will fully extend and contact the walls of the cavity. In so contacting the walls, it can medically treat the surface of the tissues by:
   a. irradiation by radioactive materials embedded mechanically or chemically in or on the walls of the tubing, or in the fluid filling the tubing,
   b. by means of fluids within the tubing 21, which are allowed to flow through fine pores in the wall of the tubing, or by osmosis, to the outside, and contact the tissues.
   c. by means of chemical materials attached to or adhering to the outer surface of the inflated tubing 21 (or the inside surface of the noninflated tubing) which can intimately contact the walls of the cavity.

Figure 5:
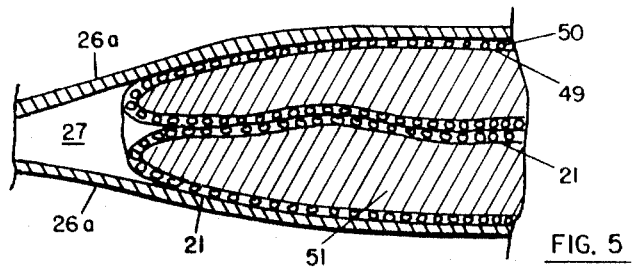
FIGS. 5 and 6 show in partial cross section further embodiments by means of which chemical or radiological treatment of the cavity can be accomplished.
Figure 6:
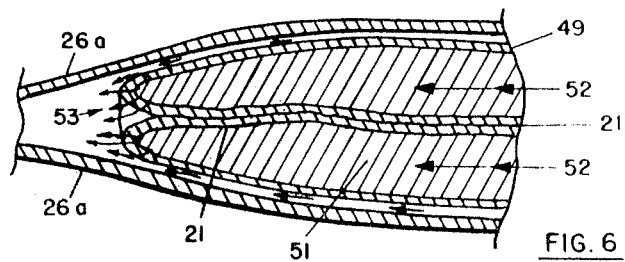
Figure 7:
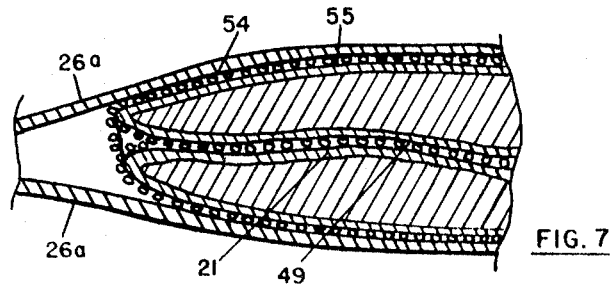
FIG. 7 shows in partial cross section another embodiment adapted to facilitate the sampling of materials or fluids from the walls of the cavity and to indicate the precise location in the cavity from which they came.

These three modes of medical treatment of the walls of the cavity are illustrated respectively in FIGS. 5, 6, and 7.

E. This intruded tubing can be used to withdraw samples of fluids or tissue fragments from the walls of the cavity, by making the outer surface of the inflated tubing sticky or tacky, or by covering it with porous absorbent material. This is also illustrated in FIG. 7.

F. It will clear that when the enlarged expanded tubing of FIGS. 5, 6, and 7 is fully intruded into the cavity, but without the retrievable cord 22, mechanical or electrical instruments can be inserted inside this plastic liner without contacting the tissues of the walls of the cavity.

Many other modifications and variations of these processes and devices might be devised in accordance with the basic principles of this invention discussed in connection with FIG. 1.

In FIG. 2, I show another embodiment of my invention. This shows the end 34 of the plastic tubing 21 overlapping the end 35 of rod 36, and fastened by means 39. The rod 36 is part of a capsule holder 37 in which can be placed some radioactive material for treating the tissue walls of the cavity. The other end of the capsule holder 37 has a ring 38 to which is fastened the retrieving cord 22. By making the length of the tubing 21 slightly longer than the depth of penetration desired for the capsule, the latter can be positioned anywhere within that length, and repositioned as many times as desired. In its movements the capsule holder slides inside of the plastic tubing without contacting the walls of the cavity, and so cannot injure the tissues. The position of the capsule, that is, its distance from the mouth of the cavity is measured by the length of the cord 22.

In FIG. 3, I show another embodiment. Here the inside end 34 of the tubing 21 is extended over the end of a small bore thick-walled flexible tubing 40, and fastened by clamp 41. When the tubing 21 is fully extended out of the body 10, it folds back over the end 40a of the tubing tube 40 exposing the interior of this smaller tube to the space within the cavity. By applying a vacuum pump, aspirator, or similar device to the outside end 42 of the tube 40, fluids will be drawn into the tube and eventually will appear at 42. This embodiment is particularly useful for extracting fluids from the stomach. By this invention, the tube 40 is *drawn* into, or pulled into the stomach through the nasal or throat passages, instead of being *pushed* into them, with a consequent minimum of irritation and discomfort to the patient. The tube 40 should be rigid enough to withstand internal vacuum without collapsing, yet be flexible enough to bend around the twists and turns of the body cavity. All of these conditions are met by using a very small bore tube, one which would not be rigid enough to be pushed into the cavity. By pulling the tubing, instead of pushing, as is now customary in medicine, a much smaller bore tube can be used with reduced discomfort to the patient.

Once the small bore tube is pulled into the cavity and its end 40a is exposed to the cavity space, it is possible to introduce through this tube an instrument probe into the body cavity. This is especially useful when the cavity is a flexible walled space, and pressure in the tubing 21 is needed to support and spread the walls 26a of the cavity. Then as the tubing is retracted by maintaining pressure in the tubing 21 and withdrawing the tubing tube 40, the additional probe inside the tube 40 can be placed just beyond the end of the extended tubing 21, where the walls of the cavity are still supported and spread. This internal probe can be of any kind, such as electrical, mechanical, or optical, in use in the medical profession.

In FIG. 4, I show another embodiment similar to that of FIG. 3 except that instead of the tube 40 I show an optical device 43 comprising a bundle of microdiameter glass fibers. This is a new type of optical device which is used to "see around corners." An optical image presented at one end of the bundle is clearly visible at the other end, in spite of bends, twists, and turns of the fiber bundle. I show as an example, the bundle 43, with a short tube 44 extending beyond the end, to house optics 45. At the outer end of the bundle 43 is a housing 46, optics 47, and screen 48. The mechanical or optical design of the device itself is not part of this invention and is shown by way of example. Other types of optical probes can be used in this application.

The tubing 21 is slipped over the end of the tube 44 and locked by clamp 41. When the tubing 21 is fully extended the optics 45 will be exposed to the cavity and an image of what it sees will be shown on the screen 48.

In FIG. 5, I show in partial cross section the extruded tubing 21 inflated and in contact with the walls 26a of the body cavity. In the material 49 that forms the walls of the tubing 21, there is embedded either mechanically or chemically, radioactive material shown schematically as particles 50. These are placed in close contact with the tissues and provide close range irradiation. This is useful where a large area of the cavity is to be irradiated. If a localized area is to be irradiated, the method of FIG. 2 can be used, in which the radioactive material is placed in the capsule holder 37.

It is of course possible to use a liquid 51 to inflate the tubing 21 in which case the liquid can be used to carry the radioactive material as a soluble component of the liquid or as a mixture. With a liquid 51 used to inflate the tubing, it is also possible to make the tubing permeable to a small degree, not sufficient to prevent the buildup of pressure to inflate the tubing, and yet sufficient to permit the "bleeding" of liquid through the walls to contact the cavity tissues. This is illustrated in FIG. 6 in which the plastic 49 is permeable and permits the fluid 51 flowing in accordance with the arrows 52 to flow through the tiny openings 53. By confining this porous plastic wall to a specific section of the tubing 21, the medication can be essentially confined to a specified portion of the cavity. If a large flow of liquid is desired, then a sizeable opening can be made in the wall of the tubing 21 at the proper distance from its end, so that when that portion of the tubing reaches the point of maximum insertion in the cavity the large opening will be exposed, and a large flow of fluid will take place from the inside of the inflated tubing to the cavity space.

In FIG. 7, I show a similar embodiment in which the exterior surface 55 of the wall 49 of the plastic tubing 21 carries adhesive material 54 to make the surface sticky or tacky, so that as it contacts the walls 26a of the cavity it will pick up particles of tissue or other matter it comes in contact with. After the tubing 21 is inflated and pressed against the walls of the cavity, and contacts the removable particles, it can be withdrawn by maintaining fluid pressure inside the body 10 and retracting the tubing 21. Thus the tacky surface 54 and all the matter adhering thereto are enclosed in the inside of the tubing and so protected from rubbing and so destroying the material. After the tubing is retracted completely and removed from the cavity, it can again be extruded onto a table and will then show the complete surface in true distance relation within the body cavity. Then the adhering material can be examined and if desired, removed for further tests. It is possible also to coat the outside surface of the tubing with a porous powder 54 that will absorb fluids, such as blood, etc., from the walls of the cavity, and so will show the position of areas of bleeding.

It will be clear tat once the tubing is extruded from the chamber and intruded into the cavity, it is possible to insert instruments of different types into the cavity through the tubing. This can be done without irritating the walls of the cavity, since the instruments will slide along the plastic which lines the walls. These instruments can be inserted through the chamber 10 while the fluid pressure is maintained inside the tubing 21. Or, by making the parts 11 and 12 easily removed from the main body of the chamber 10, the latter can be removed and the instruments introduced into the deflated tubing remaining inside the cavity. Or, if the small bore rigid wall tube 40 is used, the medical instruments or probes can be inserted through it, while the fluid pressure is maintained inside of the tubing 21.

The instruments that might be inserted can be of any type including electrical thermometer, electrical conductors for operating or measuring, electrical heating devices, electrical cooling devices (of the thermopile type), etc. These can also be introduced in the same manner as capsule holder 37 of FIG. 2 is introduced. The electrical conductors, can, for example, be part of the cord 22.

If desired, while the casing 10 is attached to the tubing, and by providing a tube 40 similar to that of FIG. 3, except that it is closed on the end 40a, and has an opening on the side 40b, the fluid pumped into the chamber through inlet 19 can be withdrawn through tube 40. Thus fluid can be circulated into and out of the tubing 21. This fluid can be of different temperature than that of the body to chill or heat the region of the cavity, or can differ in other ways from the characteristics of the cavity.

The inside end of the tubing 21 must be closed in order to hold pressure in the space 23. When used as in FIGS. 1 to 4, the end is permanently sealed against itself, or as in FIGS. 3 and 4, sealed around another device. When it is decided that instruments must be inserted through and beyond the end of the tubing 21 when it is fully intruded, a temporary seal of the tubing end is provided. This can be by means of a clip which can be attached to the cord 22 of fixed length, so that when the end of the tubing reaches the desired point, the clip is pulled off and the open end of the tubing permits entry of an instrument through the tubing and beyond it into the cavity.

If it is necessary to maintain pressure in the tubing 21 to keep the cavity walls apart, it is probably more practical to use the tube 40 and insert the probe into the cavity through it. In this way the tubing 21 can be withdrawn, as desired, by retrieving the tube 40 and continuing to scan or apply the probe to the full length of the cavity.

This invention permits the placement of a sampling or inspecting device within a long continuous cavity or tubular conduit that has many twists and bends whereas a rigid mechanical device could not be introduced, and a thin flexible device could not be "pushed" into the cavity.

In the preparation of the tubing 21 with an interior coating of chemicals, adhesive, porous absorbing material, or the like, there are two principal methods. One is to use a plain tubing, extrude it through an opening in a chamber (turning its original inside surface-out) much like in the process of this invention, coating the surface thus exposed, with chemical, adhesive, or other material, and retrieving the tubing (while turning it outside-in). The second way is to prepare a strip of heat sealable plastic material of width approximately equal to the circumference of the desired tubing, coating one surface of this tubing with the desired materials, folding the strip along its centerline (with the coated surface inside), and heat sealing the two adjacent edges to form a tube.

It is contemplated that the sleeve or tubing everted into the body cavity includes assimilable material which is affected by body fluids when retained in the intruded space a sufficient time. Thus the thin-walled tubing is expendable and may be abandoned within the cavity to be assimilated by body fluids.

This invention is susceptible to a wide variety of embodiments, some of which have been described, and many more of which will be obvious to one trained in the art, and is not to be construed as to be limited to the specific apparatus and processes described above. For example, while I have described these embodiments in connection with their use in body cavities, it will be clear that they can equally well be used in other types of cavities, in mechanical apparatus, piping, etc. The scope of this invention should be construed to be limited only by the scope of the appended claims.

I claim:

1. The method of lining a collapsed internal body cavity with thin-walled flexible tubing in medical procedures including the steps of providing a length of thin-walled tubing, initially closing one end of the tubing and distending the other end of tubing across a fluid pressure source, intraverting the closed end of the tubing into the pressure source to provide a reentrant tubing portion therein, everting the reentrant portion of the tubing into the cavity, retaining the everted portion of the tubing within the cavity for a finite time, and opening the initially closed end of the extraverted tubing within the cavity.

2. The method of claim 1 wherein the body cavity contains body fluids and the everted tubing includes assimilable material and in which the everted tubing is retained in the space for a time sufficient for body fluids to affect the assimilable material.

3. The method of claim 1 wherein the everted tubing comprises porous absorbent material and the everted tubing is retained within the space for a time sufficient for said material to absorb fluids from said space.

4. The method of claim 1 wherein the everted tubing comprises a microporous flexible material and which includes the additional step of passing fluids therethrough during the step of retaining the everted tubing cavity.

5. The method of claim 1 including the step of transporting an elongated probe means through said extraverted tubing within said cavity, and removing said probe means therefrom prior to retrogressively withdrawing the extraverted tubing.

6. In the method of claim 1 wherein the thin-walled tubing is expendable and comprises an assimilable material, the added step of separating the tubing from the fluid pressure source and abandoning the extraverted tubing within the cavity.

7. The method of claim 1 which includes the added preparatory step of modifying the thin-walled tubing to carry radiation emitting material, whereby the distended walls of the space are subjected to radiation during the step of retaining the everted sleeve therewithin for a finite time.

8. The method of claim 7 wherein the preparatory step of modifying the eversible tubing comprises supporting thereon particulate solid radiation emitting material.

9. The method of claim 8 wherein the preparatory step comprises compounding particulate solid radiation emitting material into the walls of the tubing.

10. The method of claim 8 wherein the preparatory step comprises coating a surface of the tubing with radiation emitting material.

11. The method of claim 1 wherein displacement fluid is provided which comprises radiation emitting material.

12. The method of claim 1 wherein said closed end is initially pressuretight and includes means for opening the closed end when the tubing has intruded the cavity.

13. The method of claim 1 which includes a tensile retrieval means fixed to the closed end of the tubing and extending axially of said first and eversible lengths of tubing.

14. The method of claim 1 in which at least a portion of the extravertable tubing comprises a material which is identifiably affected by body fluids.

15. The method of claim 1 wherein the tubing is expendable and comprises an assimilable material.

16. The method as in claim 1 in which said extravertable tubing comprises a thin-walled plastic tubing having its inside surface at least partially coated with a tacky nondrying adhesive.

17. The method of claim 1 wherein said extravertable tubing has on its internal surface porous absorbent material adapted to retain body fluids with which it contacts when extraverted.

18. The method of claim 1 in which the tubing includes particulate solid material supported by the wall thereof.

19. The method of claim 18 in which said particulate solid material emits radiation.

20. The method of claim 18 in which said particulate solid material is an absorbent material.